(12) United States Patent
Siracusano et al.

(10) Patent No.: US 11,218,405 B2
(45) Date of Patent: Jan. 4, 2022

(54) METHOD AND SYSTEM FOR SERVICE FUNCTION CHAINING

(71) Applicant: NEC Laboratories Europe GmbH, Heidelberg (DE)

(72) Inventors: Giuseppe Siracusano, Heidelberg (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 187 days.

(21) Appl. No.: 16/479,934

(22) PCT Filed: Jan. 25, 2017

(86) PCT No.: PCT/EP2017/051479
§ 371 (c)(1),
(2) Date: Jul. 23, 2019

(87) PCT Pub. No.: WO2018/137761
PCT Pub. Date: Aug. 2, 2018

(65) Prior Publication Data
US 2019/0379599 A1 Dec. 12, 2019

(51) Int. Cl.
*H04L 12/721* (2013.01)
*H04L 12/24* (2006.01)
*H04L 12/725* (2013.01)

(52) U.S. Cl.
CPC .......... *H04L 45/34* (2013.01); *H04L 41/5054* (2013.01); *H04L 45/38* (2013.01); *H04L 45/306* (2013.01)

(58) Field of Classification Search
CPC ... H04L 41/5054; H04L 45/306; H04L 45/34; H04L 45/38
See application file for complete search history.

(56) References Cited

U.S. PATENT DOCUMENTS

| | | | |
|---|---|---|---|
| 6,912,590 B1 | 6/2005 | Lundbaeck et al. | |
| 9,853,898 B1* | 12/2017 | Subramanian | H04L 45/745 |
| 9,979,645 B2* | 5/2018 | Li | H04L 45/54 |
| 2015/0236948 A1* | 8/2015 | Dunbar | H04L 45/22 |
| | | | 370/225 |

(Continued)

*Primary Examiner* — Asad M Nawaz
*Assistant Examiner* — Kai Chang
(74) *Attorney, Agent, or Firm* — Leydig, Voit & Mayer, Ltd.

(57) ABSTRACT

A method for service function chaining in a network includes defining, for a flow of packets, a chain of selected network service functions (NSFs) to be traversed by the flow. Each of the selected NSFs is associated with a programmable switch. The method also includes generating a chain establishment packet (CEP) that contains network identifier information (NII) about the selected NSFs and that is configured as a regular network packet to be delivered to the destination node along a network path that includes the programmable switches to which the selected NSFs is associated. Each programmable switch, upon receipt of the CEP and based on the NII about the selected NSFs contained in the CEP, performs installation of packet forwarding rules for the flow together with network address and port translation operations, and selects, on behalf of the respective NSF, socket parameters for use by the NSF for processing the flow.

16 Claims, 5 Drawing Sheets

(56) References Cited

U.S. PATENT DOCUMENTS

| | | | |
|---|---|---|---|
| 2015/0326473 A1* | 11/2015 | Dunbar | H04L 12/4633 370/392 |
| 2015/0355946 A1* | 12/2015 | Kang | G06F 9/5072 718/104 |
| 2016/0149788 A1* | 5/2016 | Zhang | H04L 41/0843 709/224 |
| 2017/0149632 A1* | 5/2017 | Saltsidis | H04L 41/0668 |
| 2017/0251065 A1* | 8/2017 | Furr | H04L 45/64 |
| 2017/0264713 A1* | 9/2017 | Shen | H04L 41/0806 |
| 2017/0317936 A1* | 11/2017 | Swaminathan | H04L 47/20 |
| 2017/0346787 A1* | 11/2017 | Menon | H04L 67/142 |

\* cited by examiner

METHOD AND SYSTEM FOR SERVICE FUNCTION CHAINING

CROSS-REFERENCE TO PRIOR APPLICATIONS

This application is a U.S. National Stage Application under 35 U.S.C. § 371 of International Application No. PCT/EP2017/051479 filed on Jan. 25, 2017. The International Application was published in English on Aug. 2, 2018, as WO 2018/137761 A1 under PCT Article 21(2).

FIELD

The present invention relates to a method for service function chaining in a network. Furthermore, the present invention relates to a network switch as well as to a network addressable apparatus hosting a network service function.

BACKGROUND

Network operators deploy network functions to enforce their policies and to provide additional services on top of plain connectivity (for reference, see M. Honda et al.: "Is it still possible to extend TCP?", in *Proceedings of the 2011 ACM SIGCOMM conference on Internet measurement conference* (IMC '11), ACM, New York, N.Y., USA, 181-194).

Content caching, NAT, TCP optimization, video transcoding, HTTP header enrichment, are examples of such services. Despite their ubiquitous usage (as documented in Z. Wang, Z. Qian, Q. Xu, Z. Mao, and M. Zhang: "An untold story of middleboxes in cellular networks", in *Proceedings of the ACM SIGCOMM 2011 conference* (SIGCOMM '11), ACM, New York, N.Y., USA, 374-385) network functions deployment is still performed by modifying the network topology. That is, network functions are hard-wired on the network traffic's path. The inflexibility and complexity of this approach is not acceptable when network functions are implemented by means of software running in virtual machines, as envisioned in the case of Network Function Virtualization (NFV). In fact, hard-wiring would hinder the benefits brought by the possibility of dynamically deploying virtual network functions (VNFs) on general purpose servers.

Therefore, there is a growing interest on Service Function Chaining (SFC) systems, which enable the flexible deployment of network functions while guaranteeing their configurable and dynamic chaining.

In general, a SFC system assigns a network flow entering the managed network to a chain of functions, and steers the flow through the functions of such chain, according to the chain's functions ordering. A number of challenges arise when addressing the design of a SFC system. First, assigning a network flow to its chain requires network traffic classification, an operation that is critical for the system scalability since it should be performed for all the handled traffic. Second, traffic forwarding should be performed according to the chain the traffic belongs to, instead of following the typical forwarding approach, e.g., based on IP routing. Third, network flows are usually bi-directional, that is, there is an upstream and a downstream direction and a network function, e.g., a firewall, may need to handle both of them. This requires performing a coordinated classification of upstream and downstream flows, and the enforcement of symmetric paths for the two directions. Finally, network functions may have dynamic and opaque behaviors that modify the network traffic in unknown ways, which may introduce a need for traffic reclassification or even make the traffic unclassifiable (for reference, see Zafar Ayyub Qazi et al.: "SIMPLE-fying middlebox policy enforcement using SDN", in *SIGCOMM Comput. Commun. Rev.* 43, 4 (August 2013), 27-38).

To address these challenges, a number of SFC systems have been already proposed (for instance, in Seyed Kaveh Fayazbakhsh et al.: "Enforcing network-wide policies in the presence of dynamic middlebox actions using flowtags", in *Proceedings of the 11th USENIX Conference on Networked Systems Design and Implementation* (NSDI'14), USENIX Association, Berkeley, Calif., USA, 533-546). However, they usually target green field or long term deployments. In fact, they require a number of changes either in the network hardware or in the network functions, or in both. In other cases, they require modifications to the network architecture. Ready to deploy solutions, which don't require such changes, may instead not handle all the aforementioned challenges. For example, some SFC systems are unable to deal with opaque network functions actions.

SUMMARY

An embodiment of the present invention provides a method for service function chaining in a network that includes defining, for a flow of network packets sent from a source node to a destination node, a chain of selected network service functions to be traversed by the flow. Each of the selected network service functions is attached or connected to a programmable switch, of a plurality of programmable switches, capable of operating as a packet forwarding element. The method also includes generating a chain establishment packet that contains network identifier information about the selected network service functions and that is configured as a regular network packet to be delivered to the destination node along a network path that includes the programmable switches to which the selected network service functions are attached or connected. Each of the programmable switches, upon receipt of the chain establishment packet and based on the network identifier information about the selected network service functions contained in the chain establishment packet, performs installation of packet forwarding rules for the flow together with network address and port translation operations, and selects, on behalf of the respective attached or connected network service function, socket parameters to be used by the network service function for processing the flow.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Embodiments of the present invention improve and further develop a method for service function chaining in a network, a network switch, as well as a network addressable apparatus hosting a network service function (NSF) in such a way that the above issues are overcome or at least partially alleviated.

In accordance with the invention, a method for service function chaining in a network is provided, wherein the method includes:

defining, for a flow of network packets sent from a source node to a destination node, a chain of selected network service functions to be traversed by the flow, wherein each of the selected network service functions is attached or connected to a programmable switch capable of operating as a packet forwarding element, generating a chain establishment packet (CEP) that contains network identifier information (NII) about the selected network service functions and that is configured as a regular network packet to be delivered to the destination node along a network path that includes the programmable switches to which the selected network service functions are attached or connected, wherein each of the programmable switches, upon receipt of the chain establishment packet and based on the network identifier information about the selected network service functions contained in the chain establishment packet, performs installation of packet forwarding rules for the flow together with network address and port translation operations, and selects, on behalf of the respective attached or connected network service function, socket parameters to be used by the network service function for processing the flow.

Furthermore, an embodiment of the present invention provides a network switch, including:

network interfaces configured to receive and transmit packets of a network flow, network service function interfaces configured to communicate with one or more attached or connected network service functions, and a processing circuitry in communication with the network interfaces and the network service function interfaces, the service chain processing circuitry configured to:

read, from a chain establishment packet that is received via a network interface, network identifier information about network service functions of a chain of network service functions selected for the network flow, and perform, based on the network identifier information about the selected network service functions contained in the chain establishment packet, installation of packet forwarding rules for the flow together with network address and port translation operations.

Still further, an embodiment of the present invention provides a network addressable apparatus hosting a network service function, the apparatus including:

a hardware component on which the network service function is executed, an operating system configured to manage the hardware component and a pool of port numbers, and a network function program running on the operating system that is configured to provide the network function's operations, wherein the network function program is configured to query the operating system to provide a socket for a new network flow, and to receive and employ a socket for the new network flow that is provided with a port number selected by a delegated switch to which the network service function is attached are connected, instead of using a port number selected autonomously by the operating system.

According to the invention it has been recognized that a configurable and dynamic chaining of network service functions can be achieved by the inclusion of chain information in and only in a first chain establishment or opening packet. The present invention enables service function chaining with no core network infrastructure support and can therefore be used, e.g., on the Internet. Data plane is more lightweight and efficient since no tunneling or extra headers are added to the packets and only the first packet of the chain requires extra processing.

In the context of the present invention it is important to note that, generally, source routing is a technique that allows a sender to specify the route that a packet should take through the network. Given its role in steering packets in a network, source routing has some similarities with the present invention. Essentially, there are two types of source routing possible, strict or loose source routing. The strict source routing lists the precise path the packet has to traverse through the network, while the loose source routing specifies a sequence of 'waypoint' addresses the packet has to traverse.

Differently from the present invention, source routing headers have to be added to every packet of the flow. This reduces the available space for the packet payload if the header is applied by the node that generates the traffic, if the header is added by an intermediate node (proxy or classifier on path) the packets composing the flows need to be fragmented.

Furthermore, the source routing header is added at IP level, this information is not exposed by the OS socket and cannot be processed at application level.

In contrast, embodiments of the present invention add chaining information only to the first packet of a flow and adds such information in L4+ header, enabling the chaining of L4+ opaque functions over, e.g., a general purpose TCP/IP network. Furthermore, embodiments of the invention, which require only minimal modifications of the network functions, address also classification issues when packets traverse opaque functions. In these cases, packets can be assigned to their chains after processing by the function even if the function modifies packets' header.

According to an embodiment, the chain establishment packet may be generated either by the source node (i.e. the entity that starts the communication) or by an on-path proxy.

According to an embodiment, the chain establishment packet is configured to contain a list that includes network service function identifiers of the selected network service functions and an address of the destination node as a last entry of the list.

According to an embodiment, the chain establishment packet may be configured to use indirection functions that map a network service function address and/or port numbers to an address and/or port numbers of the respective programmable switch to which the network service function is attached or connected.

According to an embodiment, the chain establishment packet may be configured to include an additional identification element of the respective programmable switches.

According to an embodiment, a method includes the steps of receiving, by a programmable switch, a chain establishment packet, reading from the chain establishment packet a network identifier of the next network service function in the chain of selected network service functions, and steering the flow towards the next network service function by installing appropriate packet forwarding rules for the flow.

Embodiments of the present invention address network service functions that, when processing network packets of a flow, modify the network packets' headers According to these embodiments, such network service function may execute a network identifier selection delegation operation that is configured to delegate to the programmable switch to which the network service function is attached or connected a task of defining a delegation network address or port number the network service function will use when sending network packets in response to the reception of network packets of the flow.

Specifically, according to an embodiment, a programmable switch may generate either a delegation source address or port number or a delegation destination address or port number and, for the purpose of enabling usage, passing the generated address or port number to the respective network service function.

According to an embodiment, a programmable switch may be pre-configured with a pool of reserved addresses or port numbers the respective network service function does not assign in any other case. In such case the programmable switch may select a delegation network address or port number from this pool of reserved addresses or port numbers.

There are several ways how to design and further develop the teaching of the present invention in an advantageous way. To this end it is to be referred to the following explanation of preferred embodiments of the invention by way of example, illustrated by the drawings. In connection with the explanation of the preferred embodiments of the invention by the aid of the drawings, generally preferred embodiments and further developments of the teaching will be explained.

Generally, a service function chain includes a sequence of network service functions (hereinafter sometimes briefly referred to as service functions or network functions, or simply as NFs) that are hosted by various network nodes. When a traffic flow is steered along a service chain, packets in the traffic flow are processed by the various service functions. These service functions may include typical network services such as content caching, firewall, network access translation (NAT), video transcoding, TCP optimization, deep packet inspection (DPI), etc. After processing a packet of a flow by applying a particular service function, the packet will be forwarded to the next service function in the chain.

Essentially, embodiments of the present invention described hereinafter in detail, relate to one or more of the following aspects:
1. Usage of explicitly addressed programmable switches to enforce traffic steering;
2. Generation of a first packet of a new network flow to contain a list of network functions to be traversed;
3. Configuration of NAPT operations in the programmable switches;
4. Definition of a delegation function, which instructs programmable switches to define the network parameters a NF should be using for a given flow.

Figure 1:
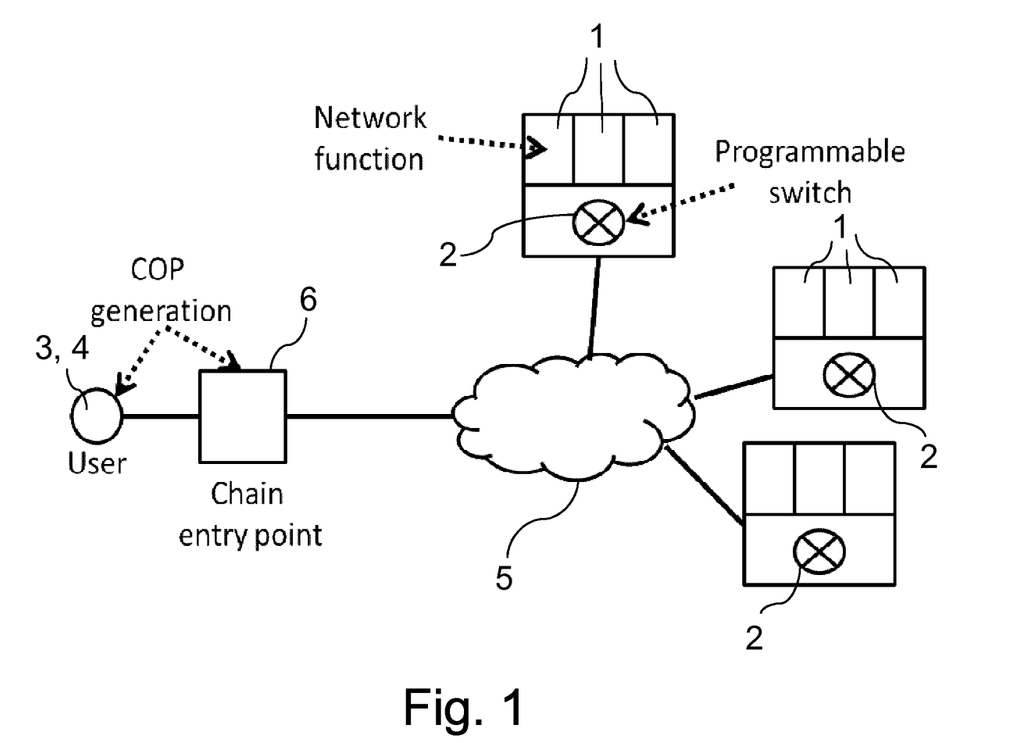
FIG. 1 is a schematic view illustrating service function chaining in a network in accordance with an embodiment of the present invention.

FIG. 1 illustrates, according to an embodiment, a system for performing resource efficient chaining of transparent and non-transparent (layer 4-7) service functions 1 without network support using programmable (software) switches 2. According to common deployment models, a chain of service functions 1 typically applies a sequence of service functions 1 to a traffic flow in a specific order. In the context of the present invention it is assumed that each of the service functions 1 is attached or connected to a programmable switch 2. These programmable switches 2, through which network traffic traverses, are capable of operating as packet forwarding elements.

According to the embodiment of FIG. 1, it is assumed that a flow of network packets is sent from user 3, who acts as a source node 4 starting the communication, to a destination node (not shown), e.g., via the Internet 5. For this flow, a chain of selected network service functions 1 to be traversed by the flow is defined. This definition can be made by the user 3 itself, it can be imposed merely by the network, or can be a composition of a user 3 selection and network demand.

Based on the selected network service functions 1, at first, either the user 3 itself or a chain entry point 6 generates a chain establishment or chain opening packet (hereinafter briefly denoted COP) that is delivered to those programmable switches 2 to which the selected network service functions 1 are connected. Generally, the entity that generates the COP can be any on-path proxy that intercepts flows entering the network.

At a logical level, the COP contains a list of the selected NFs that should be traversed by the flow. In practice, the COP contains a list of NFs' identifiers such as a list of IP address/port number couples. The last entry of the list is always the final destination of the flow, for instance, a content provider's server.

The following notation will be used to express the content of a COP, according to an embodiment: COP (src, dst) [NF1,NF2, . . . ], where 'dst' is the destination included in the packet header and used by the routing system to define the next hop of the packet. 'src' is the source value included in the packet's header. The list [NF1, NF2, . . . ] is the list of network functions to be used for the flow.

For simplicity and without loss of generality, in accordance with the embodiment described in connection with FIG. 1 it is assumed that the COP is generated by an on-path proxy 6. Upon reception of a new packet starting a flow from a client C, i.e. user 3, destined to a server S as destination node (i.e., packet (C,S)), and assuming that two network functions are included in the chain, the proxy 6 will generate a COP (C,NF1)[NF2,S].

Here, NF1, NF2 are addresses assigned to the switches 2 to which the network functions 1 are attached or connected. However, it is also possible to use an indirection function to map NF1 to a switch address, and therefore have different addresses between the network functions 1 and the switches 2 they are attached or connected to. In another case, the COP could be extended to introduce an additional identification element for the switches 2, such as COP (src, dst) [sw1: NF1,sw2:NF2, . . . ]. In accordance with the embodiment of FIG. 1 the easier case of network functions 1 and switches 2 having the same assigned IP address when they are directly connected will be assumed, as it will ease standing of essential aspect of the invention.

The COP (C,NF1)[ NF2,S] is a regular network packet for e.g., a TCP/IP network, and it is therefore delivered to NF1

It is pointed out once again that in this example NF1 is the address of a switch 2 connected to the NF1 function 1 (that has the same address). The switch 2 receives the packet and performs one of the following two actions, depending on whether the respective network function 1 does not change the packet headers (case 1) or does change the packet headers (case 2). The notation (src,dst) forwardTo is used to express a switch forwarding rule that causes "packets from src and destined to dst being sent on the switch port that goes towards forwardTo":

In case 1, the switch 2 is configured to create a number of four forwarding rules as follows:
(C, NF1)→NF1
(NF1, C)→C
(NF1, NF2)→NF2
(NF2, NF1)→NF1

While the first two rules deal with the packets from/to the client C, the next two rules deal with packets to/from the next network function (or final destination). In this context is noted that the switch 2 reads from the COP(C,NF1)[NF2, S] the address of NF2 and therefore can generate all the rules as soon as the COP is received.

Figure 2:
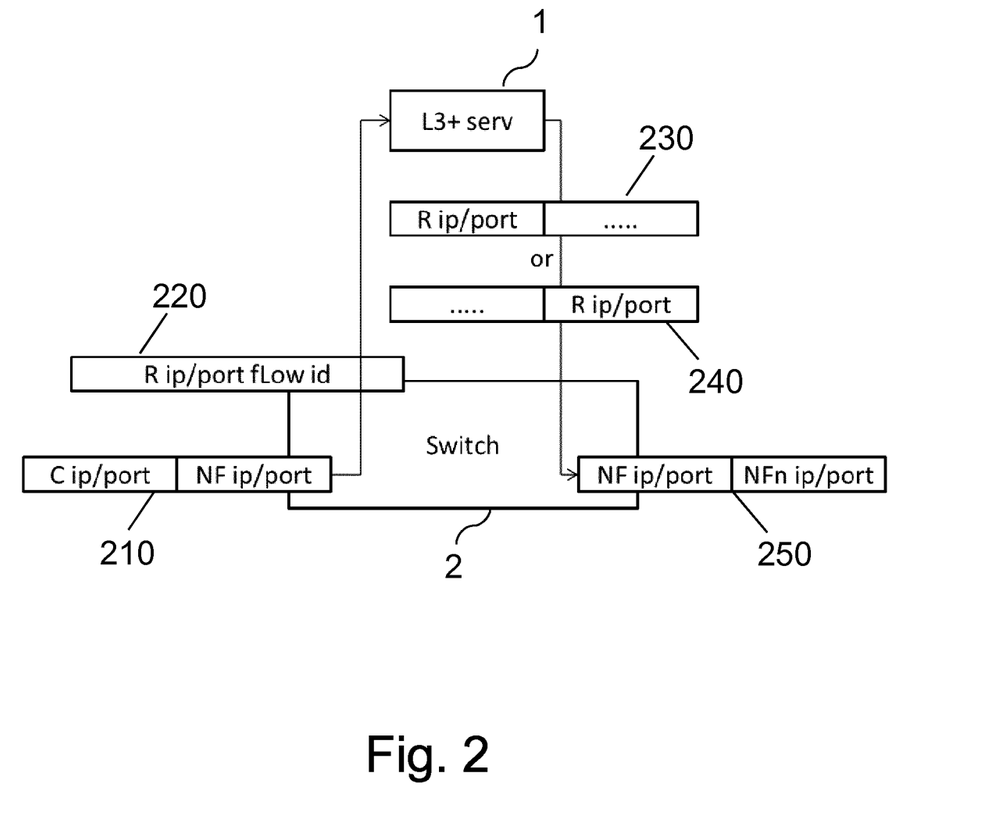
FIG. 2 is a schematic view illustrating a network identifier selection delegation operation in accordance with an embodiment of the present invention.

On the other hand, in case 2, i.e. when a network function 1 modifies the packet headers, the corresponding switch 2 cannot correlate packets entering the NF 1 with packets being sent back by the NF 1. Therefore, the switch 2 cannot correctly re-classify packets after the network function 1 to perform the steering towards the next service function 1 in the chain. In this case, as illustrated in FIG. 2, the network function 1, which here is assumed to be a L3+ service function, is configured to support a network identifier selection delegation operation. In essence, the function 1 delegates to the switch 2 the task of creating a network address which the function 1 will use when sending packets in the response to the reception of a given network flow.

For example, upon reception of COP(C,NF1)[NF2,S], as shown at 210 in FIG. 2 using a shortened notation, the switch 2 would generate the following rules:
(C, NF1)→NF1+generate and include R in the packet
(NF1, C)→C
(R, NF2)→NF2+rewrite R with NF1
(NF2, NF1)→NF1+rewrite NF1 with R,
where R is a source or destination address generated by the switch 2 and passed to the function 1 in the context of the network identifier selection delegation operation, as shown at 220. That is, the network function 1 will use R either as source address, as shown at 230, or as destination address, as shown at 240, for packets that are generated as a reaction to the new received network flow. According to an embodiment, it may be provided that the address R is exchanged, and exists, only between the function 1 and the switch 2.

Upon receiving packets back from the network function 1, the switch 2 will be able, by detecting the assigned address R, to identify and reclassify the packets as belonging to a particular flow, and to apply the appropriate forwarding rule for the respective flow, as indicated at 250.

Figure 3:
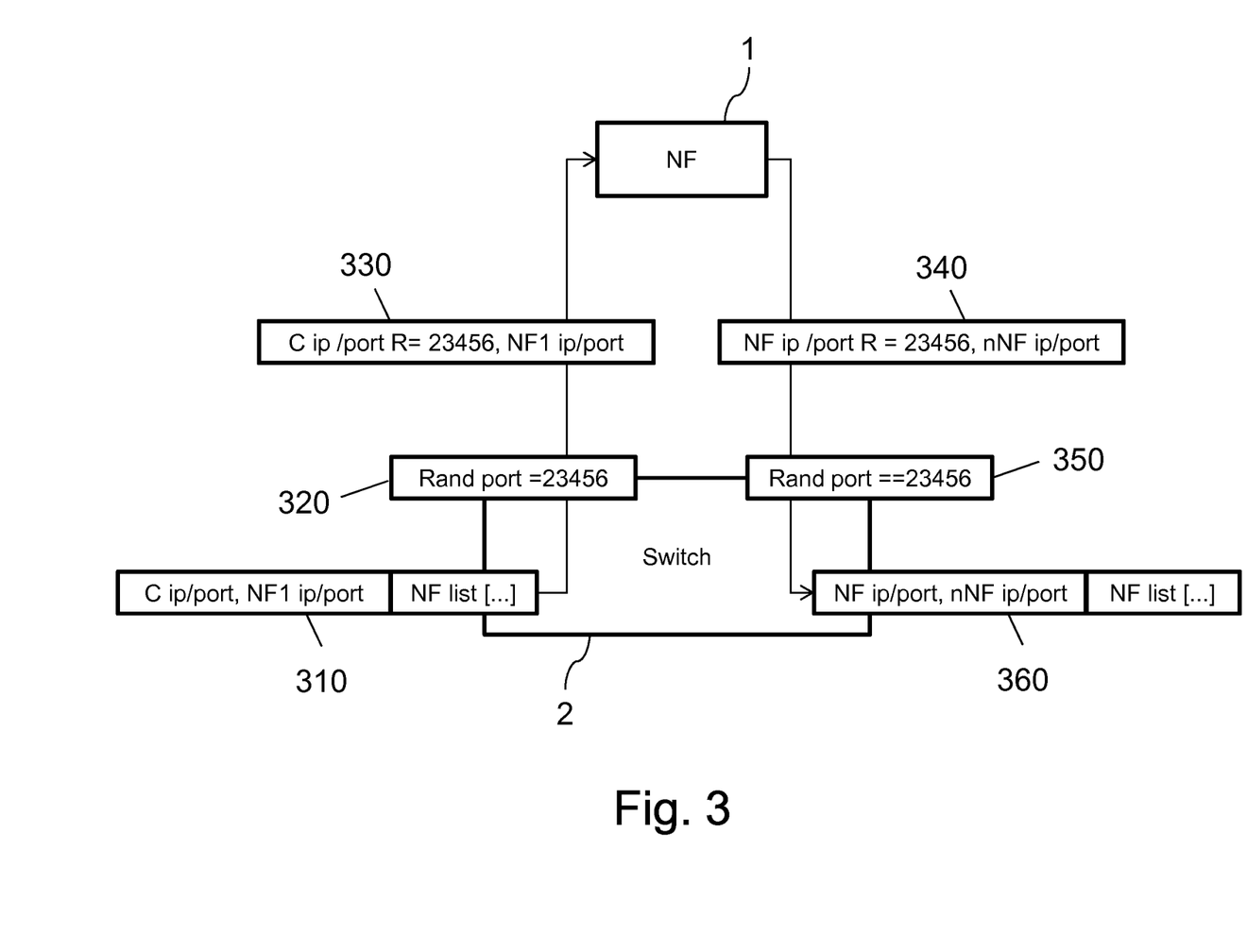
FIG. 3 is a schematic view illustrating service function chaining for a TCP flow in accordance with an embodiment of the present invention, using a shortened address/port notation.
Figure 4:
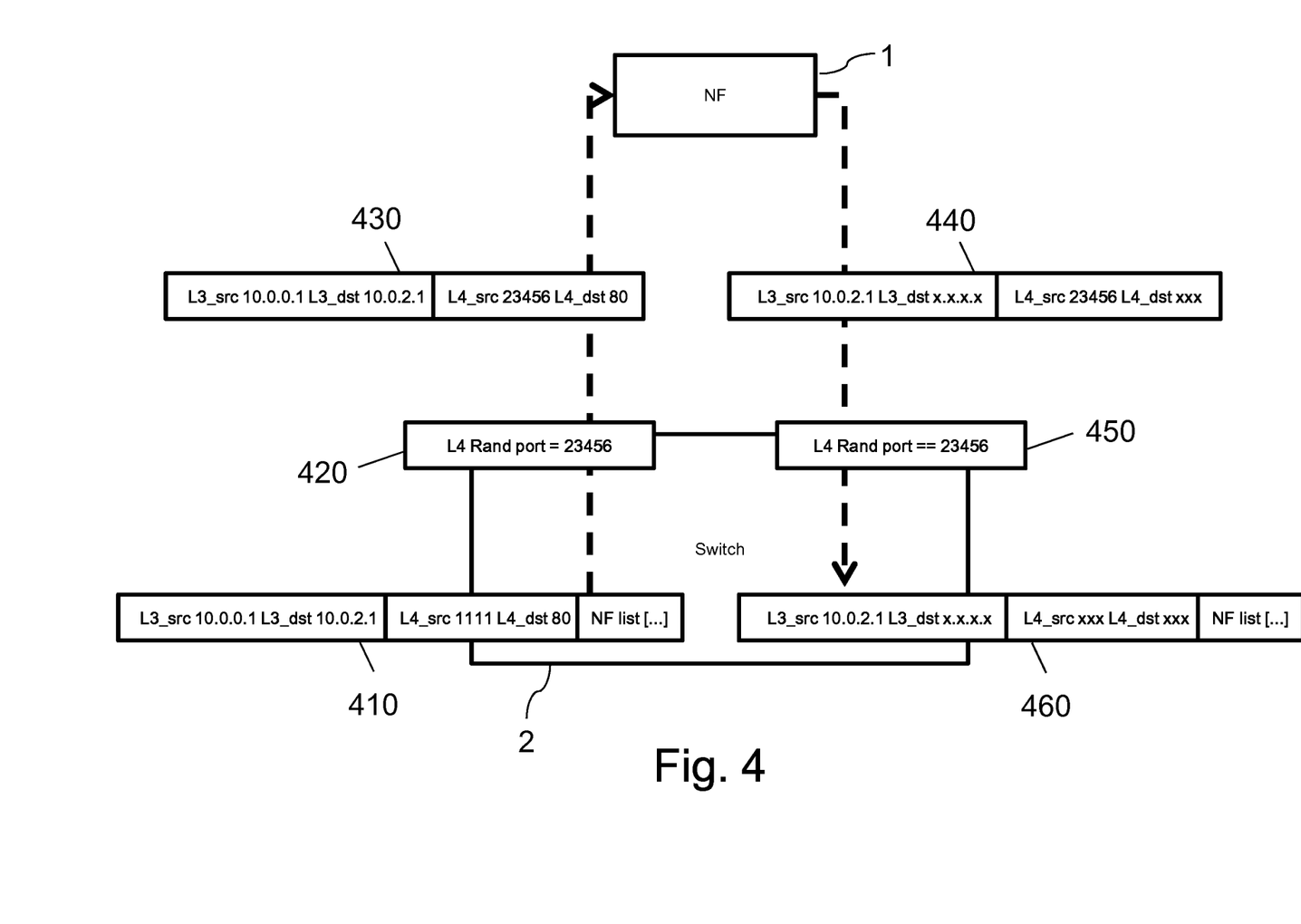
FIG. 4 is a schematic view illustrating the embodiment of FIG. 3, using a more realistic address/port notation.

Referring to FIGS. 3 and 4, these figures illustrate an embodiment where the flow initiated by the user 3 is a TCP flow. Both figures are almost identical, with the only difference that, while FIG. 3 uses a shortened, more general address/port notation for the packets, FIG. 4 uses a more realistic address/port notation.

In case of TCP flows, the COP can be the TCP SYN packet, whose payload can contain the list of network functions 1 to be traversed by the TCP flow. Once the packet arrives at a NF's switch 2, the switch 2 reads the SYN packet's payload to extract the next hop. Using this information, the switch 2 obtains a TCP SYN plus the NF list, as indicated 310/410.

Next, as indicated at 320/420, the switch 2 randomly selects a source port number ('L4 Rand port=23456') and associates this source port number to the TCP flow. In this case, the switch 2 has been configured in advance with a bucket of reserved ports that can be used during the port number selection and that the network function 1 does not assign in any other case.

Next, the switch 2 installs a rule to forward subsequent packets of the same TCP flow to the connected network function 1. Such rule performs a rewriting of the source TCP port of the flow, as indicated at 330/430.

In the illustrated embodiment the network function 1 is modified to use the source port of the received packet for the generation of any new packet that belongs to the same TCP flow. For instance, a web proxy that receives a connection from 1.2.3.4:23456, will open new TCP connection towards the next hop using a source port 23456, as indicated at 340/440.

At 350/450, once a packet sent by the network function 1 is received by the switch 2, the switch 2 will detect the assigned source port. Therefore, the switch 2 can identify the flow again. This will allow the switch 2 at changing, with a relevant forwarding rule, the destination of the flow to point to the next network function in the chain, as indicated at 360/460.

Figure 5:
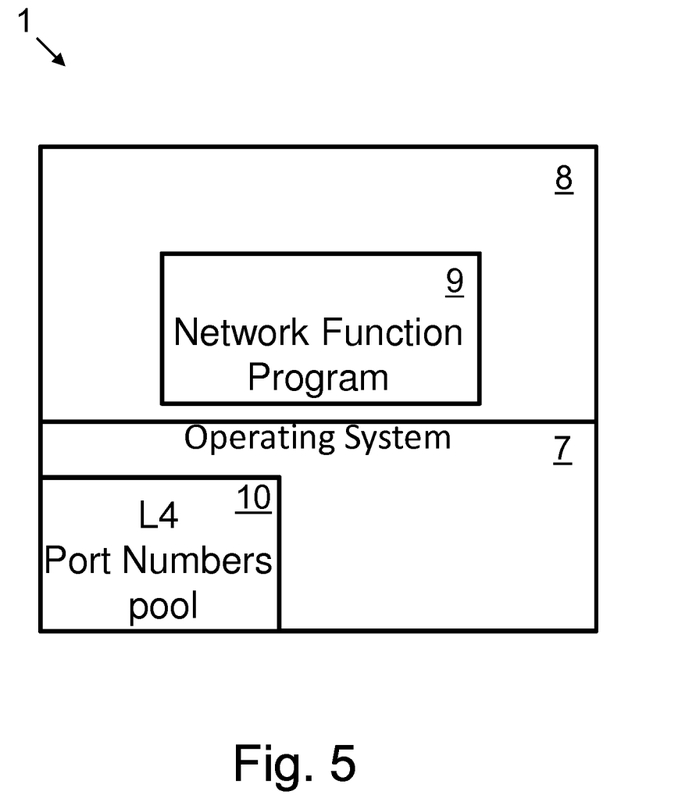
FIG. 5 is a schematic view illustrating the structure of a network service function in accordance with an embodiment of the present invention.

Referring now to FIG. 5, this figure schematically illustrates the structure of a network service function 1 in accordance with embodiments of the present invention.

The network function 1 is composed of multiple modules. A general operating system 7 is used to manage the hardware component 8 on which the function is executed. A network function program 9, running on the Operating System 7, provides the specific network function's operations.

To manage network communications in the operating system 7, a common abstraction is the socket. The socket is specified by a data structure that contains L3, L4 destination and source addresses and other pieces of information. When a Network Function Program 9 has to create a new communication channel with a different network node, it asks the Operating System 7 to provide a new socket.

The new socket is then provided with some pieces of information already filled by the operating system 7. For instance, the source L4 port value is usually extracted from a pool 10 of L4 port numbers that the operating system 7 manages. According to an embodiment of the invention, the network functions 1 delegate to the programmable switches 2 the generation of relevant socket parameters to be used for a newly established network flow. More specifically, the management of a subset of the port numbers pool 10 is delegated to the switching element 2 to which the network function 1 is attached or connected. As a result, when a specific packet that contains a port number selected by the switch 2 is received by the Network Function Program 9, the program can request a new socket which will be provided with the port number selected by the switch 2, instead of using a port number selected autonomously by the operating system 7.

To summarize, embodiments of the present invention relate to one or more of the following aspects:
1. Generation, by a user or a chain entry point, a first packet (COP) and inclusion of chain information (e.g. a list of functions in the chain) in and only in this first chain establishment packet;

2. Delegation of the selection of a network function's relevant socket parameters to a switching element based on the chain establishment packet information, i.e. network functions and programmable switching are configured to delegate to the switches the generation of relevant socket parameters for the functions;

3. Processing, by the switches attached to the network functions, of the COP to read the list of functions, and perform accordingly NAPT operations and socket parameters selection.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for service function chaining in a network, the method comprising:
    defining, for a flow of network packets sent from a source node to a destination node, a chain of selected network service functions to be traversed by the flow, wherein:
        each of the selected network service functions is attached or connected to a programmable switch, of a plurality of programmable switches, capable of operating as a packet forwarding element, and
        each of the selected network service functions is provided by a program running on an operating system configured to manage a hardware component and a pool of addresses; and
    generating a chain establishment packet that contains network identifier information about the selected network service functions and that is configured as a regular data plane network packet to be delivered to the destination node along a network path that includes the programmable switches to which the selected network service functions are attached or connected,
    wherein a respective programmable switch of the plurality of programmable switches, upon receipt of the chain establishment packet and based on the network identifier information about the selected network service functions contained in the chain establishment packet, is configured to:
        select, for the flow, an address from the pool of addresses managed by the operating system, and
        install packet forwarding rules for the flow, the packet forwarding rules for the flow including instructions to rewrite subsequent packets of the flow to include the selected address and to forward the rewritten packets to the respective network service function attached or connected to the respective programmable switch, and
    wherein the respective network service function attached or connected to the respective programmable switch is configured to delegate, to the respective programmable switch, selection of socket parameters for processing the flow.

2. The method according to claim 1, wherein the chain establishment packet is generated either by the source node or by an on-path proxy.

3. The method according to claim 1, wherein the chain establishment packet is configured to contain a list that includes network service function identifiers of the selected network service functions and an address of the destination node as a last entry of the list.

4. The method according to claim 1, wherein the chain establishment packet is configured to use indirection functions that map a-network service function addresses to addresses of the programmable switches to which the network service functions are attached or connected.

5. The method according to claim 1, wherein the chain establishment packet is configured to include additional identification elements of the plurality of programmable switches.

6. The method according to claim 1, wherein the packet forwarding rules for the flow further include instructions to select the socket parameters for processing the flow so as to steer the flow towards a next network service function in the chain of selected network service functions.

7. The method according to claim 1, wherein the socket parameters for processing the flow include a delegation network address or port number to be used by the respective network service function attached or connected to the respective programmable switch when sending network packets in response to the reception of network packets of the flow.

8. The method according to claim 7, wherein the respective programmable is further configured to select the socket parameters by selecting either a delegation source address or port number or a delegation destination address or port number and to pass the generated delegation source address or port number or delegation destination address or port number to the respective network service function attached or connected to the respective programmable switch.

9. The method according to claim 7, further comprising:
    pre-configuring the respective programmable switch with set of reserved addresses, each reserved address being included in the pool of addresses managed by the operating system, wherein each reserved address is a port number that the respective network service function does not assign in any other case.

10. The method according to claim 1, wherein the pool of addresses is a pool of port numbers managed by the operating system.

11. A network switch, comprising:
network interfaces configured to receive and transmit packets of a network flow,
network service function interfaces configured to communicate with one or more attached or connected network service functions, and
a processing circuitry in communication with the network interfaces and the network service function interfaces, the processing circuitry configured to:
read, from a data plane chain establishment packet received via a network interface of the network interfaces, network identifier information about network service functions of a chain of network service functions selected for the network flow,
select, for a respective network service function of the chain of network service functions selected for the network flow, an address, the address being selected from a pool of addresses managed by an operating system on which a program that provides the respective network service function is running, and
install packet forwarding rules for the network flow, the packet forwarding rules for the network flow including instructions to rewrite subsequent packets of the network flow to include the selected address and to forward the rewritten packets to the respective network service function attached or connected to the respective programmable switch,
wherein the respective network service function is configured to delegate, to the network switch, selection of socket parameters to be used by the respective network service function for processing the network flow.

12. The network switch according to claim 11, wherein the processing circuitry is further configured to:
select, on behalf of the respective network service function, the socket parameters to be used by the respective network service function for processing the network flow.

13. The network switch according to claim 11, wherein the service chain processing circuitry is configured to:
read, from the chain establishment packet a network identifier of a next network service function in the chain of network service functions, and
steer the network flow towards the next network service function by installing additional packet forwarding rules for the network flow that include instructions to select the socket parameters to be used by respective network service function for processing the network flow so as to include an address of the next network service function in the chain of network service functions.

14. The network switch according to claim 11, wherein the processing circuitry is further configured to:
determine that the respective network service function, when processing network packets of the network flow, modifies headers of the network packets,
execute a network identifier selection delegation operation with the respective network service function, and
generate either a delegation source address or port number or a delegation destination address or port number and pass the generated delegation source address or port number of delegation destination address or port number to the respective network service function.

15. The network switch according to claim 14, wherein the processing circuitry is further configured to:
use the generated delegation source address or port number or the generated delegation destination address or port number for identifying and/or reclassifying packets received from the network service function as belonging to a particular network flow.

16. The method according to claim 11, wherein the pool of addresses is a pool of port numbers managed by the operating system.

* * * * *